United States Patent Office 3,398,343
Patented Aug. 20, 1968

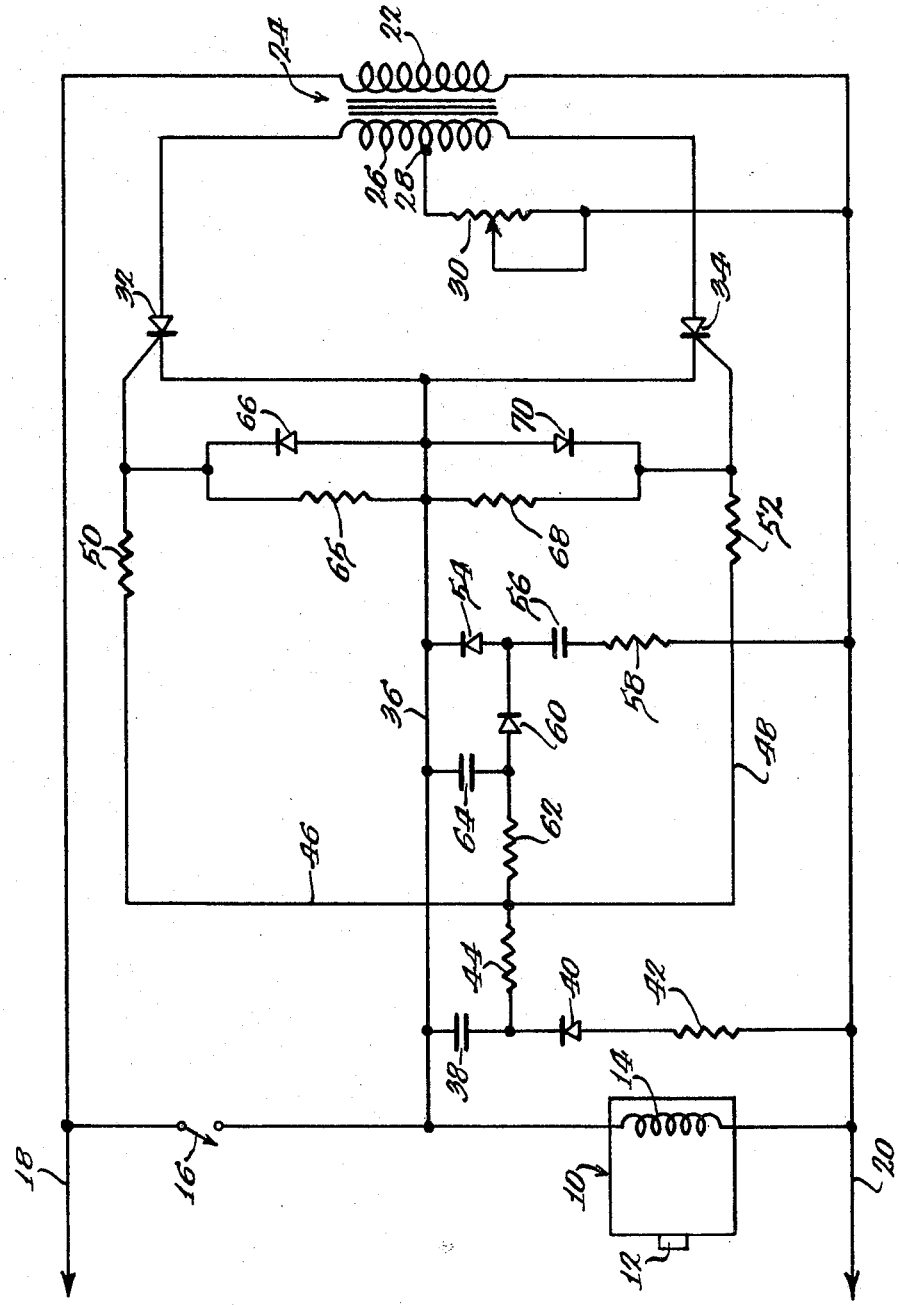

3,398,343
AC MOTOR BRAKING SYSTEM USING A FULL WAVE RECTIFIER CIRCUIT
William H. Plumpe, Jr., St. Louis, Mo., assignor to Biological Research, Inc., a corporation of Delaware
Filed Aug. 5, 1965, Ser. No. 477,553
7 Claims. (Cl. 318—212)

ABSTRACT OF THE DISCLOSURE

A pair of silicon controlled rectifiers are connected in circuit with an AC motor to cause full wave rectified DC voltage to flow through the motor for braking purposes. A timing network gates the silicon controlled rectifiers for a predetermined time period after AC voltage has been disconnected from across the motor.

---

This invention relates to a motor braking device for use with alternating current motors.

Many types of machinery which perform intermittent process operations are driven by electrical motors and the sequence of operations, or programming, of the machine will frequently involve the use of switches that are adapted to turn the motor on or off at frequent intervals during a period of operation. In machines of this type, it is usually essential that the prime mover be stopped quickly and precisely, so that there will be no significant overtravel. For example, this problem is particularly acute in the design of servo-mechanisms. Whatever over-travel is encountered is usually corrected by reverse-travel but the corrective reverse-travel itself ordinarily involves another over-travel in the reverse direction and a further correction is required. This effect is termed "hunting" and usually produces errors in the control-function of a servo-system.

Therefore, it is desirable to employ some kind of braking mechanism so that the machinery will stop almost immediately whenever stoppage is required, and over-travel will be eliminated or at least reduced to non-significant proportions. Existing types of braking mechanisms, however, are mechanical in operation and rely upon the interengagement of two frictional members, such as brake-drum and brake band, or a clutch disk and clutch plate. This type of braking device, being essentially mechanical, requires some increment of the time in which to function and, therefore, has inherent limitations, so far as accuracy and precision are concerned. Moreover, mechanical braking devices wear rather rapidly and, therefore, require frequent adjustment, maintenance and repair. In addition to this, mechanical braking devices are comparatively large and costly.

There are also many machine tools which must be stopped repeatedly in the course of a particular operation. In such cases, present practice is merely to pull the switch and let the machine coast to a stop. Obviously this is a time wasting procedure, especially in the case of large heavy machinery, which has developed considerable momentum and is carefully designed to reduce friction in the bearings. Such machine tools often require a number of minutes to slow down and stop. Thus, when the work must be frequently measured with a micrometer, or other gauge, as is necessary in close tolerance machining, the frequent stops will add a large percentage of useless time to the job. Very few such machine tools have been built with brakes and, therefore, it is highly desirable to provide a braking mechanism which can be easily applied to existing equipment at reasonable cost.

In order to solve the foregoing problems, it has been known to provide a substantially electronic system including a large capacitor to store direct current power to be applied to the field winding of a motor to supply braking action upon the termination of the energization of the motor. On motors above one quarter horsepower, the capacitor must be so large as to be impractical and, in many cases, the resulting braking action is erratic.

It is, therefore, the primary object of the invention to provide an electronic braking device which may be used with alternating current motors of any size and which provides a uniform braking action.

More specifically, it is an object of the invention to provide a motor braking device for an AC motor having switch means in series therewith across a source of power wherein the braking device comprises a direct current supply connected acros sthe AC motor, and timing means responsive to the opening of the motor switch for actuating the direct current supply means for a predetermined time period for causing direct current to flow through the motor to provide the desired braking action.

Another object of the invention is the provision of such a braking device including means for precluding operation of the timing means while the motor switch is closed.

Yet another object of the invention is the provision of such a motor braking device wherein the direct current supply means comprises a rectifier.

Still another object of the invention is the provision of such a braking device wherein the rectifier is comprised of a pair of silicon controlled-rectifiers connected to provide full wave rectification and arranged to be triggered by the timing means.

A still further object of the invention is the provision of such a braking device wherein the timing means comprises a capacitor which is charged during operation of the motor and is connected to the gates of the silicon controlled-rectifiers to provide a positive voltage thereon upon the termination of motor operation to cause the silicon controlled-rectifiers to conduct and provide the direct current utilized in braking the motor.

Other objects and advantages of the invention will be apparent from the following description taken in connection with the accompanying drawing in which:

The Figure is a schematic drawing of an exemplary form of motor braking device made according to the invention.

A conventional alternating current motor, generally designated 10, has an output shaft 12 and a field winding 14. The field winding 14 is connected in series with a switch 16 across a pair of lines 18 and 20 which are adapted to be connected to a suitable source of alternating current. The switch 16 serves as an "off-on" switch for the motor 10 and may be of a mechanical or electronic type. As will be appreciated by those skilled in the art, the switch 16 may be operated manually or automatically as by a cam or electrical pulse.

The primary coil 22 of a power transformer 24 is also connected across the lines 18 and 20 and is adapted to be energized independently of the operation of the switch 16. The secondary coil 26 of the power transformer 24 includes a center tap 28. A variable resistance 30 is interposed between the center tap 28 and the line 20. The variable resistance 30, in an exemplary form of the invention may have a value of 1 to 100 ohms and functions as a surge limiter and a braking rate control in a manner to be seen hereinafter. If desired, the variable resistor 30 may be omitted, the resistance to be provided thereby being incorporated in the secondary 26 of the transformer 24 in a manner well known in the art.

The opposite ends of the secondary coil 26 are connected to the anodes of a pair of silicon controlled-rectifiers 32 and 34. The cathodes of the silicon controlled-rectifiers 32 and 34 have a common connection to a line 36 which is connected to the motor field winding 14 at its junction with the switch 16. As will be apparent, when the silicon controlled-rectifiers 32 and 34 are conducting, lines 20 and 36 will cause full wave rectified direct current to flow through the field winding 14 from the direct current supply formed by the silicon controlled-rectifiers 32 and 34 and the transformer 24. While such a full wave rectified voltage includes some "ripple," there is some direct current flowing at substantially all times to provide a smooth braking action of the motor 10.

Means are also provided for actuating the direct current supply for a predetermined time period. In the exemplary form of the invention shown in the figure, it is necessary to provide a positive voltage at the gate of the silicon controlled-rectifiers 32 and 34 for a predetermined time period such that the silicon controlled-rectifiers 32 and 34 will not extinguish at the null points of the alternating current applied thereto or during the half cycle in which they are non-conductive. In order to provide this function, there is provided a capacitor 38, which may have a value of 750 microfarads, in series with a diode 40 and a surge limiting resistor 42 having a value of 20 ohms. The capacitor 38, the diode 40 and the surge limiting resistor 42 are connected in series across the lines 36 and 20 such that when the switch 16 is closed and the motor 10 is energized, the capacitor 38 will be charged to provide a positive voltage at its junction with the diode 40. A 5,000 ohm resistor 44 is connected to the junction of the capacitor 38 and the diode 40 and to a pair of lines 46 and 48 which terminate in resistors 50 and 52 respectively. The resistors 50 and 52 may have values of 2,000 ohms and are connected to the gates of the silicon controlled-rectifiers 32 and 34 respectively to insure that equal current is conducted to both of the gates. Thus it will be apparent that under certain circumstances to be described hereinafter, the positive voltage present at the junction between the capacitor 38 and the diode 40 will be applied to the gates of the silicon controlled-rectifiers 32 and 34 to trigger the latter and cause conduction thereof to provide a full wave rectified DC voltage through the field winding 14 of the motor 10 as mentioned above.

In order to preclude actuation of the rectifiers when the switch 16 is closed, means are provided to provide the junction between the resistor 44 and the lines 46 and 48, and thus the gates of the silicon controlled-rectifiers 32 and 34, with a negative voltage to keep the silicon controlled-rectifiers 32 and 34 turned off. More specifically, a series circuit of a diode 54, an 8 microfarad capacitor 56 and a 20 ohm surge limiting resistor 58 are arranged across the lines 36 and 20. Another circuit comprised of a diode 60 and a resistor 62, which may have a value of 1300 ohms, is interposed between the junction of the diode 54 and the capacitor 56 and the junction of the resistor 44 and the lines 46 and 48. Finally, a capacitor 64 having a value of 3 microfarads is connected to line 36 and the junction of the diode 60 and the resistor 62. The diodes 54 and 60 and the capacitors 64 and 56, connected in the manner just described, form a conventional cascade doubler and are arranged with respect to the lines 36 and 20 such that the junction between the diode 60 and the capacitor 64 is maintained at a negative voltage of approximately twice the magnitude as that of the positive voltage present at the junction between the capacitor 38 and the diode 40. As a result, the junction between the resistors 44 and 62 and the lines 46 and 48 is maintained negative during substantially the entire period that the cascade doubler is energized by alternating current.

Means are also provided in the direct current supply circuit for conducting off anode to gate leakage in the silicon controlled-rectifiers 32 and 34 and for protecting the gates of the silicon controlled-rectifiers 32 and 34 from excess negative voltage. To achieve these functions there is provided a parallel circuit comprising a resistor 65 and a diode 66 interposed between the gate of the silicon controlled-rectifier 32 and the line 36. The resistor 65 may have a value of 1,000 ohms and serves to conduct off any anode to gate leakage in the silicon controlled-rectifier 32. The diode 66 is arranged to be conductive when the gate of the silicon controlled-rectifier 32 is subjected to an unduly negative voltage such that it might damage the silicon controlled-rectifier 32. Preferably, the diode 66 is a silicon diode because of its property of having a relatively high forward breakover voltage. This characteristic serves to maintain a small negative voltage on the gate of the silicon controlled-rectifier 32 thereby improving the breakdown characteristics thereof. A similar resistor 68 and diode 70 are interposed in parallel with each other between the line 38 and the gate of the silicon controlled-rectifier 34 and function identically with the resistor 65 and the diode 66.

Operation of the device is as follows. The switch 16 is closed to energize the motor 10. As a result thereof, the capacitor 38 and the capacitors 64 and 56 begin to charge. Because of the overwhelmingly great difference in capacity between the capacitor 38 and the capacitors 64 and 56, the latter two capacitors will charge much more rapidly than the former and will thereby maintain the junction between the resistors 44 and 62 and the lines 46 and 48 negative. Accordingly, the gates of the silicon controlled-rectifiers 32 and 34 will be maintained negative and they will not conduct. When the switch 16 is opened, the capacitors 64 and 56 discharge almost instantly while the capacitor 38 will discharge at a much slower rate. In a matter of milliseconds after the opening of the switch 16, the charge on the capacitors 64 and 56 will have been dissipated while the capacitor 38 still has a significant charge maintained thereon. Accordingly, the potential at the junction between the resistors 44 and 62 and the lines 46 and 48 will swing positive and a positive voltage will be applied to the gates of the silicon controlled-rectifiers 32 and 34. The silicon controlled-rectifiers 32 and 34 will then begin to conduct to provide full wave rectification of the alternating current output of the transformer 24. During the null points of the full wave rectified wave and during the half cycle during which each of the silicon controlled-rectifiers 32 and 34 are not conducting, the rectifiers 32 and 34 will not be extinguished until the charge on the capacitor 38 is completely dissipated. Upon the dissipation of such a charge, the silicon controlled-rectifiers 32 and 34, either at the null point of the full wave rectified direct current or during the half cycle of the input alternating current during which they are not conductive, will extinguish. By virtue of this arrangement, the time period during which the braking action is to be applied to the motor 10 may be controlled principally by the capacity of the capacitor 38. The intensity of the braking action is easily controlled by regulating the variable resistor 30 to vary the voltage of the full wave rectified direct current applied to the field winding 14 of the motor 10.

Should the switch 16 be closed before the charge on the capacitor 38 is entirely dissipated, the capacitors 64 and 56 will almost instanly become charged to thereby apply a negative voltage at the junction between the resistors 44 and 62 and the lines 46 and 48 to preclude the silicon controlled-rectifiers 32 and 34 from conducting once they have been extinguished by the passing of a null point or the non-conducting half cycle of the alternating current input. If the resistor 30 is properly chosen, conduction by the silicon controlled-rectifiers 32 and 34 during the first one or two cycles after the closing of switch 16 will not cause damage to the silicon controlled-rectifiers 32 and 34 due to the surge limiting feature thereof.

From the foregoing, it will be apparent that the invention provides a braking device having an excellent braking rate and timing control, a system that is readily adaptable to triggering by outside pickups, as for example photocells, a system that is free from the wear that accompanies mechanical devices, a system that does not require switch contacts thereby eliminating the possibility of arcs, and a system that may be simply installed by connecting three wires at the motor switch.

Having described a specific embodiment of my invention as required by 35 U.S.C. 112, I do not wish to be limited to the specific detail set forth, but rather, to have my invention construed broadly according to the true spirit thereof as set forth in the following claims.

I claim.

1. A motor braking device for an AC motor in serial connection with switch means across a source of power, said braking device comprising: full wave rectifying means comprising a pair of silicon controlled rectifiers, means for connecting said full wave rectifying means across said motor, and timing means including a capacitor connected to each of the gates of said rectifiers and responsive to the opening of said switch means for actuating said full wave rectifying means for a predetermined time period whereby said motor will be subjected to the output of said full wave rectifying means to be braked thereby.

2. The motor braking device of claim 1 wherein said timing means further includes circuit means connected to each of the gates of said rectifiers for precluding said rectifiers from conducting when said switch means is closed.

3. The motor braking device of claim 2 wherein said circuit means comprises a pair of diodes and a pair of capacitors.

4. A motor braking device for an AC motor, comprising: a plurality of controlled rectifier means, each including a gate terminal responsive to a gate signal thereon for causing unidirectional conduction; a source of AC voltage having a plurality of output lines each carrying an AC voltage of different phase; first circuit means connecting each controlled rectifier means to a different output line of said source and to said AC motor; and second circuit means connected to said gate terminals for developing gate signals thereon which in combination with said first circuit means cause full wave rectified DC voltage to flow to said AC motor, thereby braking said motor, including timing means operative to develop said gate signals for a predetermined time period and thereafter extinguish said gate signals, said timing means including capacitor means connected to charge while the motor is running without braking, the charge on said capacitor means forming said gate signals.

5. The motor braking device of claim 4 including second capacitor means connected to charge while the motor is running without braking, means connecting said second capacitor means in said second circuit to prevent the charge on the first named capacitor means from being operative to cause said controlled rectifier means to conduct, and discharge means effective when said motor is to be braked for discharging said second capacitor means before the first named capacitor means becomes discharged.

6. A motor braking device for an AC motor, comprising: a plurality of controlled rectifier means, each including a gate terminal responsive to a gate signal thereon for causing unidirectional conduction; a source of AC voltage having a plurality of output lines each carrying an AC voltage of different phase; first circuit means connecting each controlled rectifier means to a different output line of said source and to said AC motor, including variable resistance means for varying the magnitude of the full wave rectified DC voltage, and second circuit means connected to said gate terminals for developing gate signals thereon which in combination with said first circuit means cause full wave rectified DC voltage to flow to said AC motor, thereby braking said motor.

7. A motor braking device for an AC motor, comprising: a plurality of controlled rectifier means, each including a gate terminal responsive to a gate signal thereon for causing unidirectional conduction; a source of AC voltage having a plurality of output lines each carrying an AC voltage of different phase; first circuit means connecting each controlled rectifier means to a different output line of said source and to said AC motor; second circuit means connected to said gate terminals for developing gate signals thereon which in combination with said first circuit means cause full wave rectified DC voltage to flow to said AC motor, thereby braking said motor, and said controlled rectifier means comprise solid state controlled rectifiers each having a pair of terminals in addition to said gate terminals, said pair of terminals being connected in said first circuit, and said gate terminal and one of said pair of terminals being connected in said second circuit.

References Cited

UNITED STATES PATENTS

| 2,847,763 | 8/1958 | Thomas | 318—212 XR |
|---|---|---|---|
| 2,514,342 | 7/1950 | Schoenbaum | 318—375 |
| 2,818,539 | 12/1957 | Johnson | 318—212 |
| 2,854,613 | 9/1958 | Mowery | 318—212 |
| 2,929,977 | 3/1960 | Choudhury | 318—212 |
| 3,011,112 | 11/1961 | Mowery | 318—212 |

ORIS L. RADER, *Primary Examiner.*

G. RUBINSON, *Assistant Examiner.*